UNITED STATES PATENT OFFICE.

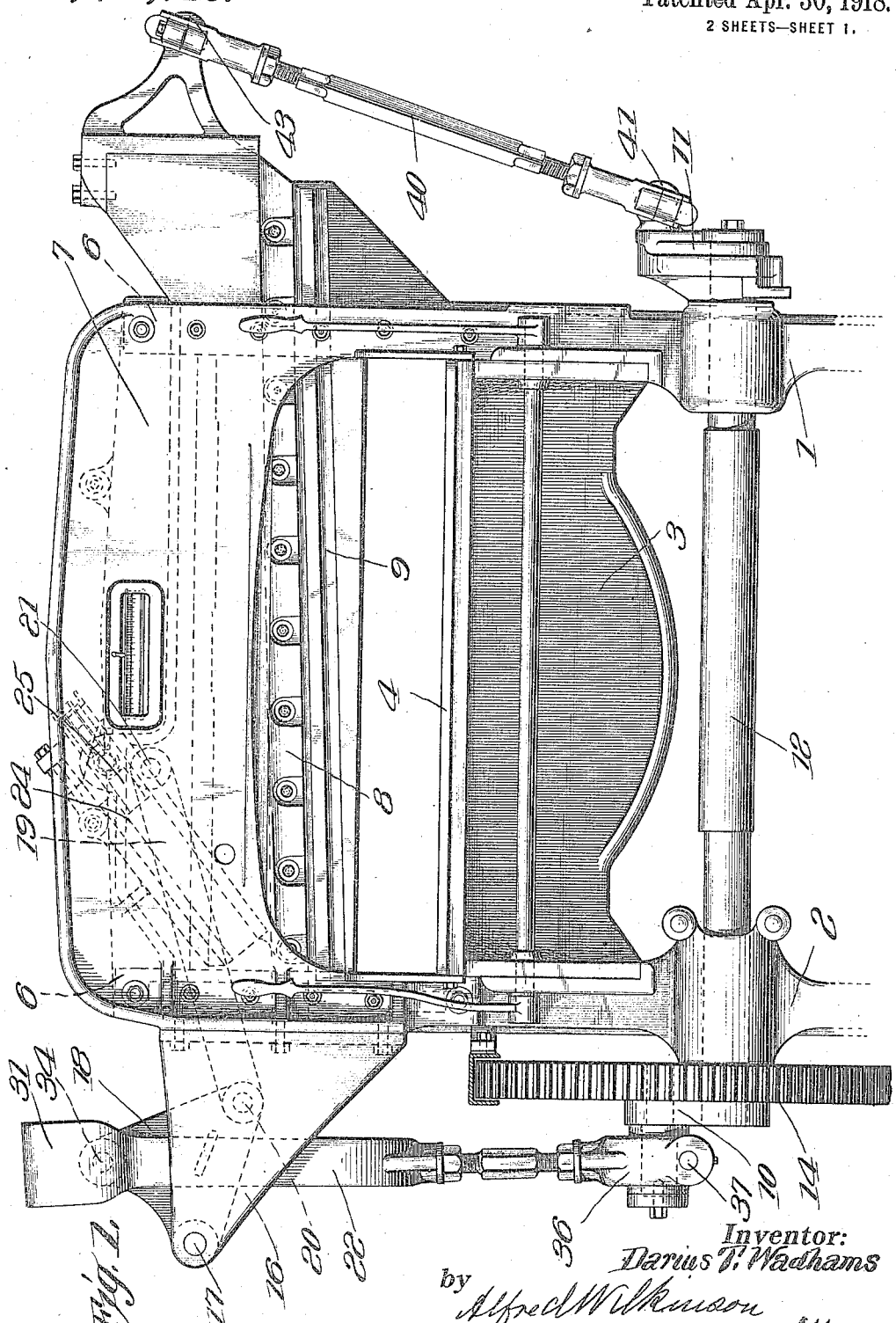

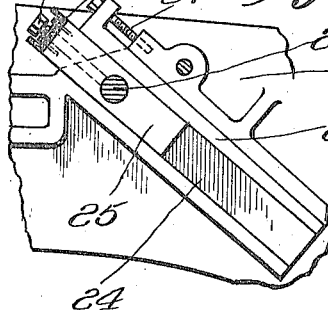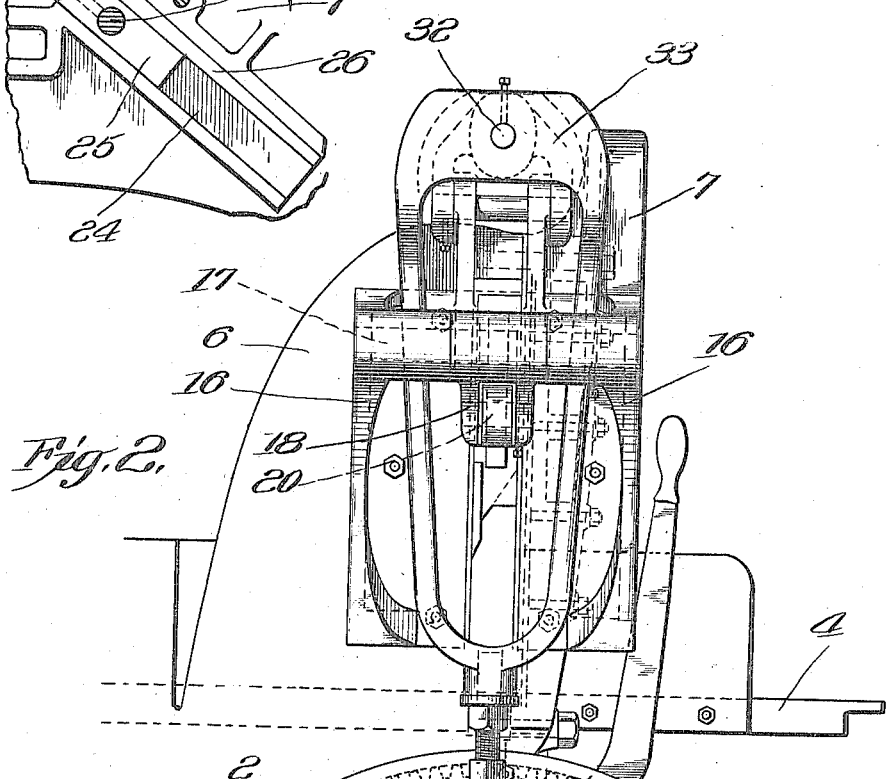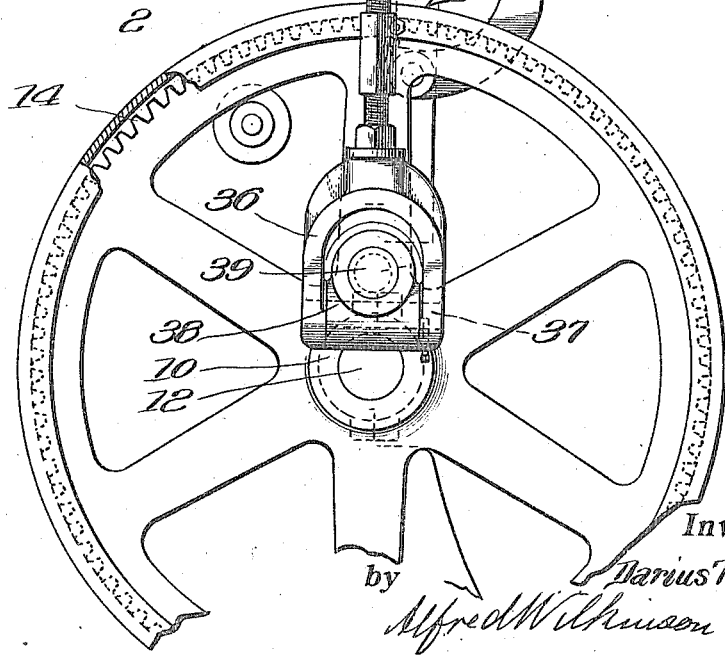

DARIUS T. WADHAMS, OF OSWEGO, NEW YORK, ASSIGNOR TO NIEL GRAY, JR., OF OSWEGO, NEW YORK.

CUTTING-MACHINE.

1,264,716.  Specification of Letters Patent.  Patented Apr. 30, 1918.

Application filed August 7, 1915. Serial No. 44,346.

*To all whom it may concern:*

Be it known that I, DARIUS T. WADHAMS, a citizen of the United States, residing at Oswego, in the county of Oswego and State of New York, have invented new and useful Improvements in Cutting-Machines, of which the following is a specification.

This invention relates to cutting machines and consists in an improved arrangement and mode of operation designed particularly for imparting the approved shear or inclined stroke to the cutting knife in an improved manner wherein the dissipation of the power by friction is materially reduced.

Accordingly, my invention consists in the arrangement of the operating connections to the knife whereby the direction of the force applied thereto will substantially coincide with the direction in which the knife is constrained to move by its guiding means. The resulting operation of the knife is uniform and smooth in its action owing to the great reduction in the frictional resistance of the guiding parts which heretofore has been a considerable disturbing factor both in absorbing of the power and in the resulting unevenness of the cutting operation.

The features of my invention are illustrated in the accompanying drawings wherein a desirable embodiment thereof is shown and wherein the reference numerals of this description are applied to corresponding parts in the several views.

In the drawings Figure 1 is a front elevation of a machine embodying the features of my invention. Fig. 2 is a partial side elevation thereof and Fig. 3 is a detail view of the guiding parts.

In the drawings I have shown a desirable construction embodying the features of my invention for contributing to the effectiveness of the cutting operation wherein they are incorporated in a machine employing an approved double crank arrangement for operating the knife. As shown the machine comprises the usual right and left standards 1 and 2 secured together by suitable go-between 3 and cross-rods (not shown) to form the frame support for the table 4 upon which the stock to be cut is placed. Oppositely supported on the frame above the table are the usual uprights 6 and the front faces thereof are arranged, in conjunction with the front guide plate 7 to form the oppositely positioned slide-ways for the knife-stock 8.

The knife stock 8, with the knife 9 bolted thereon, is fitted to reciprocate in the slide-ways so formed and is shown to be operated from the cranks 10—11 arranged on the opposite ends of a crank shaft 12 suitably journaled in the frame and operated in the customary manner through a large gear 14 thereon from any suitable source of power.

The connections from the cranks 10—11 to the knife stock for transmitting the motion thereto in the improved manner of my invention are here shown to comprise means at the left hand side for imparting to the knife a pulling force in the desired inclined direction for producing the usual draw cut wherein the knife as it is lowered is given a longitudinal movement also. To accomplish the foregoing I have provided oppositely arranged brackets 16—16 secured to upright 6 and front plate 7 and provided with the bearing pin 17 upon which is fulcrumed a bell crank lever 18 connected to the knife stock 8 by a link 19 pivotally connected therewith at 20 and with the knife stock at 21. An adjustable connecting rod 22 is universally connected to the crank 10 and to the bell crank lever 18 whereby the movement is communicated from the crank to the knife through the lever 18 and thereby transformed to a downwardly inclined force. The force so applied is substantially parallel to the usual guiding parts for the knife here shown as a guideway bearing 24 formed in the rear face of the guide plate 7 as best shown in Fig. 3 within which is fitted a sliding block 25 pivotally carried on the knife stock. As shown the guideway may be adjustable for wear by means of the tapering gib piece 26 secured in position by a bolt 27. The guide block 25 is shown affixed to the pivotal pin 28, fitted to an aperture in the knife stock, by means of a set screw 29. A suitable felt oiler 30 is shown on the end of the block for lubricating the guide-way.

As best shown in Fig. 2, the upper end of the connecting rod 22 is in the form of a yoke 31 pivotally connected by pin 32 to a forked knuckle member 33 pivoted to the bell crank lever 18 by a pin 34 arranged at right angles to the pin 32 whereby universal connection is made. Similarly, universal connection is made to the crank 10 at the lower end of the rod 22 by means of a yoke piece 36 connected by pivot pin 37 to a knuckle member 38 journaled on the crank pin 39, the pin 37 and the crank pin 39 being in right angular relation.

From the right hand crank 11 connection is made directly to the knife stock by the adjustable connection 40 universally connected by suitable joints with the crank pin and with the end of the knife stock. As will be readily understood the stresses applied to the knife at the right hand side will be a resultant of the downward force imparted thereto by the crank 11 through the connection 40 and the longitudinally directed force applied through the described connections at the left hand side whereby its direction of motion will substantially coincide with the direction of stroke determined by the guideway 24. It thus results that the direction of motion given to the knife by its operating connections is substantially parallel to its guiding parts whereby the frictional resistance in the latter is reduced to the minimum and in consequence the cutting operation is steadier and more easily made. By the reduction in the power absorbed in friction there is a corresponding gain in the forces effective in the cutting operation.

In the drawings the knife is shown inclined in its elevated position for producing the double shear effect particularly described and claimed in patent to Niel Gray Jr. No. 1,084,006 and my invention may desirably be applied to such a machine, but it is not in any sense limited to such use but may desirably be applied to any sort of a shear-stroke cutting machine, for cutting paper or other material.

While I have illustrated a desirable embodiment of my invention it will be understood that many changes can be made therein without departing from the scope thereof. It is therefore intended that all matter contained herein shall be interpreted as illustrative and not in a limiting sense.

Having described my invention I claim,

1. A machine of the character described having a supporting frame, a table for the work, a knife stock, a knife carried by the stock, a guide-way member, engaging means therewith carried by the knife-stock, a crank-shaft, oppositely arranged cranks thereon, connections from one crank to the knife-stock comprising a bell-crank-lever suitably fulcrumed, a link pivotally connected to the bell-crank-lever and to the knife-stock and a connection from the crank to the bell-crank-lever and a connecting rod from the opposite crank to the knife-stock whereby the resultant forces applied to the latter are substantially in the direction parallel to the movement of the knife.

2. A machine of the character described having a supporting frame, a table for the work, a knife-stock, a knife carried by the stock, a guide-plate provided with an inclined guide-way, a guide-block pivotally carried by the knife-stock and fitted to the guide-way, an adjustable gib-piece for the guideway, a felt-oiler carried by the guide block, brackets supported on the side of the supporting frame, a bell-crank-lever fulcrumed in the brackets, a crank-shaft, oppositely positioned cranks therein, an adjustable universal connection from one crank to the bell-crank-lever, a link connection pivoted to said lever and to the knife-stock whereby movement is imparted thereto from the bell-crank-lever in an inclined direction and an adjustable connecting rod from the opposite crank universally connected thereto and to the knife-stock substantially as described.

3. A machine of the character described having a supporting frame, a table for the work, a knife stock, a knife carried by the stock, a guide-way member, engaging means therewith carried by the knife-stock, a crank-shaft, oppositely arranged cranks thereon, connections from one crank to the knife-stock comprising a bell-crank-lever suitably fulcrumed, a link pivotally connected to the bell-crank-lever and to the knife-stock, a pitman connected to the crank and a universal connection connecting said pitman to the bell-crank-lever, said universal connection, fulcrum and pivotal connection of the link being arranged with their central transverse axes in the same vertical plane and in alinement with the knife stock, and a connecting rod from the opposite crank to the knife stock whereby the resultant forces applied to the latter are substantially in the direction parallel to the movement of the knife.

4. A machine of the character described having a supporting frame, a table for the work, a knife stock, a knife carried by the stock, a guide-way member, engaging means therewith carried by the knife-stock, a crank-shaft, a crank thereon, connections from the crank to the knife-stock comprising a bell crank lever suitably fulcrumed, a link pivotally connected to the bell-crank-lever and to the knife-stock, a pitman connected to the crank and a universal connection connecting said pitman to the bell-crank-lever, said universal connection, fulcrum and pivotal connection of the link being arranged with their central transverse axes in the same vertical plane and in alinement with the knife stock substantially as described.

In testimony whereof I have signed my name to this specification in the presence of two subscribing witnesses.

DARIUS T. WADHAMS.

Witnesses:
PATRICK J. CLANCY,
ALICE A. SKINNER.

Copies of this patent may be obtained for five cents each, by addressing the "Commissioner of Patents, Washington, D. C."